(12) United States Patent
Galuten et al.

(10) Patent No.: US 6,918,059 B1
(45) Date of Patent: Jul. 12, 2005

(54) METHOD AND SYSTEM FOR HANDLING ERRORS IN A DISTRIBUTED COMPUTER SYSTEM

(75) Inventors: Albhy Galuten, Santa Monica, CA (US); Peter Williams, Sydney (AU)

(73) Assignee: Universal Music Group, Santa Monica, CA (US)

( * ) Notice: Subject to any disclaimer, the term of this patent is extended or adjusted under 35 U.S.C. 154(b) by 0 days.

(21) Appl. No.: 09/559,849

(22) Filed: Apr. 27, 2000

Related U.S. Application Data
(60) Provisional application No. 60/131,412, filed on Apr. 28, 1999.

(51) Int. Cl.[7] .............................................. G06F 11/00
(52) U.S. Cl. ........................................ 714/31; 714/48
(58) Field of Search ........................... 714/2, 4, 25, 26, 714/31, 37, 38, 48, 57

(56) References Cited

U.S. PATENT DOCUMENTS

| | | | |
|---|---|---|---|
| 4,041,455 A | * 8/1977 | Norberg | 714/25 |
| 5,287,505 A | 2/1994 | Calvert et al. | 395/600 |
| 5,357,611 A | * 10/1994 | Kaneshima | 714/57 |
| 5,428,619 A | * 6/1995 | Schwartz et al. | 714/712 |
| 5,483,637 A | * 1/1996 | Winokur et al. | 714/26 |
| 5,563,805 A | 10/1996 | Arbuckle et al. | 364/514 C |
| 5,594,861 A | * 1/1997 | Jonsson et al. | 714/2 |
| 5,664,093 A | * 9/1997 | Barnett et al. | 714/31 |
| 5,666,481 A | * 9/1997 | Lewis | 714/4 |
| 5,715,496 A | * 2/1998 | Sawada et al. | 399/8 |
| 5,748,880 A | * 5/1998 | Ito et al. | 714/46 |
| 5,819,019 A | * 10/1998 | Nelson | 714/4 |
| 5,862,308 A | * 1/1999 | Andress et al. | 714/10 |
| 5,892,898 A | 4/1999 | Fujii et al. | 395/185.1 |
| 5,892,900 A | 4/1999 | Ginter et al. | 395/186 |
| 5,910,987 A | 6/1999 | Ginter et al. | 380/24 |
| 5,915,019 A | 6/1999 | Ginter et al. | 380/4 |
| 5,917,912 A | 6/1999 | Ginter et al. | 380/24 |
| 5,920,861 A | 7/1999 | Hall et al. | 707/9 |
| 5,941,996 A | 8/1999 | Smith et al. | 714/47 |
| 5,943,422 A | 8/1999 | Van Wie et al. | 380/9 |
| 5,944,782 A | * 8/1999 | Noble et al. | 709/202 |
| 5,949,876 A | 9/1999 | Ginter et al. | 380/4 |

(Continued)

FOREIGN PATENT DOCUMENTS

| | | | |
|---|---|---|---|
| AU | AU-A-36840/97 | 2/1998 | H04L/9/32 |
| WO | WO97/43761 | 11/1997 | G11B/20/00 |
| WO | WO98/10381 | 3/1998 | G07F/7/00 |
| WO | WO98/37481 | 8/1998 | G06F/1/00 |
| WO | WO99/24928 | 5/1999 | G06F/17/60 |
| WO | WO99/48296 | 9/1999 | H04N/7/167 |

OTHER PUBLICATIONS

Goyer et al., "A Fault–Tolerant Strategy for Hierarchical Control in Distributed Computing Systems", 19990, IEEE, pp. 290–297.*

*Primary Examiner*—Robert Beausoliel
*Assistant Examiner*—Gabriel Chu
(74) *Attorney, Agent, or Firm*—Darby & Darby

(57) ABSTRACT

A method and system for tracking and processing errors in a distributed computer system. As an application encounters an error, a centralized system intercepts and assumes the processing of that error event. The central error processing may be used with a distributed network connecting the applications running on various user computers. Upon receipt of an error message from an application, the system creates an informative error package, propagates appropriate error alert to relevant subsystems, and attempts to resolve the error. The error may be resolved in various ways. For example, the system may select and dispatch appropriate help information to the user; or the system may locate an alternative resource to substitute for the failed resource. The system may prioritize errors when there is more than one error still unresolved at any given time. In addition, the system may filter errors that require different levels of response and the system may direct errors to resources capable of assisting in resolving the error.

25 Claims, 2 Drawing Sheets

U.S. PATENT DOCUMENTS

| | | | | |
|---|---|---|---|---|
| 5,968,189 A | * | 10/1999 | Desnoyers et al. | 714/47 |
| 5,982,891 A | | 11/1999 | Ginter et al. | 380/4 |
| 5,983,364 A | * | 11/1999 | Bortcosh et al. | 714/25 |
| 6,000,045 A | * | 12/1999 | Lewis | 714/47 |
| 6,000,046 A | * | 12/1999 | Passmore | 714/57 |
| 6,032,001 A | * | 2/2000 | Miyawaki | 399/8 |
| 6,205,466 B1 | * | 3/2001 | Karp et al. | 718/104 |
| 6,249,812 B1 | * | 6/2001 | Cromer et al. | 709/221 |
| 6,401,116 B1 | * | 6/2002 | Okigami | 709/223 |
| 6,446,224 B1 | * | 9/2002 | Chang et al. | 714/54 |
| 6,513,129 B1 | * | 1/2003 | Tentij et al. | 714/4 |

* cited by examiner

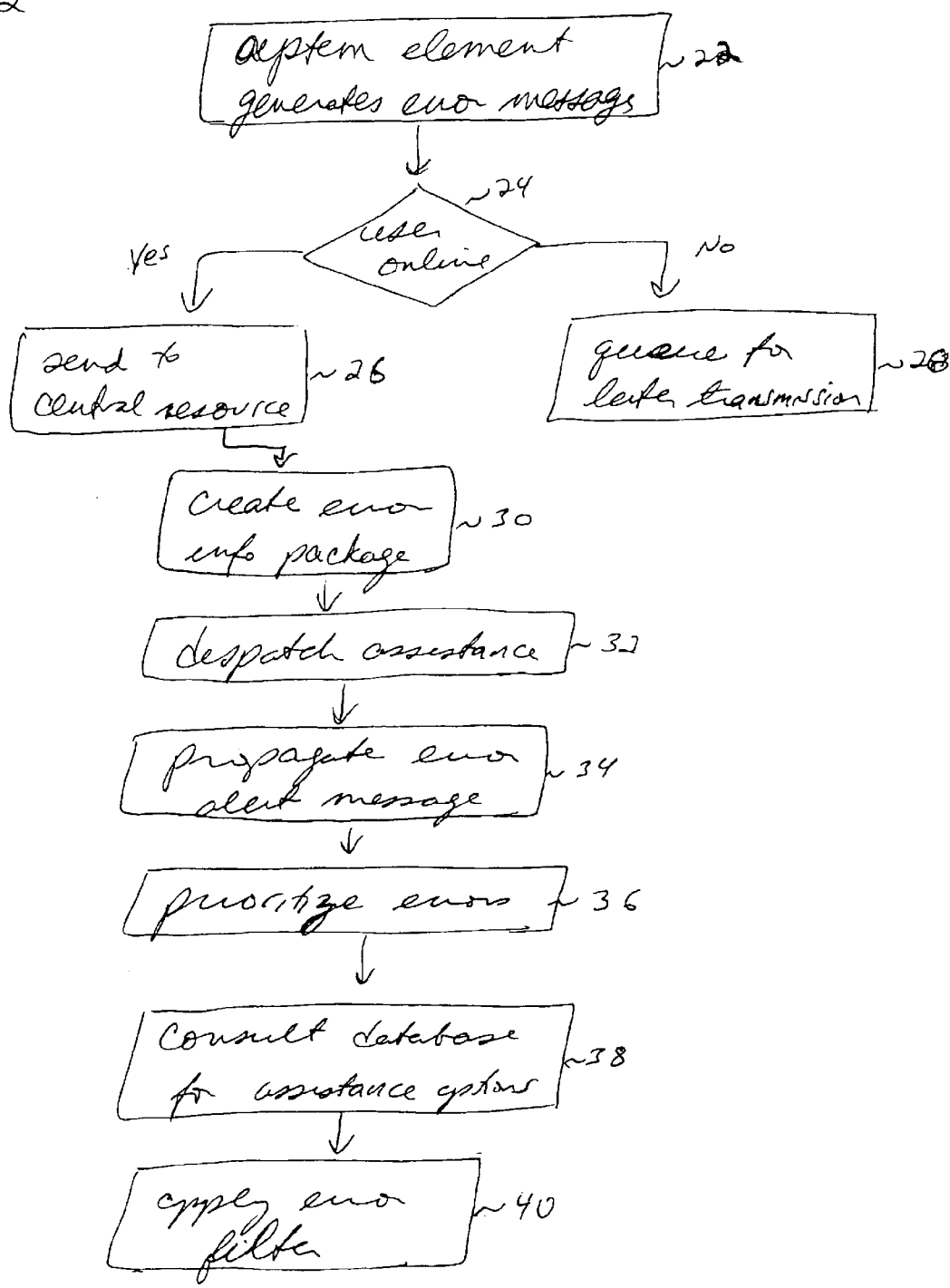

METHOD AND SYSTEM FOR HANDLING ERRORS IN A DISTRIBUTED COMPUTER SYSTEM

This application claims the priority of U.S. provisional patent application No. 60/131,412 filed Apr. 28, 1999, which is incorporated herein by reference.

FIELD OF THE INVENTION

The present invention relates to tracking and responding to errors in a distributed electronic system.

BACKGROUND OF THE INVENTION

Application programs are typically designed to be self-contained, each having its own capacity for handling errors that may occur during the execution of the program. With the growing popularity of operating multiple programs simultaneously, much of the code for and processing of error messages in each program is redundant and therefore, inefficient. Furthermore, with the ever increasing use of the Internet, many applications operating locally use networked resources. Some applications use a central resource to provide automated help to users connected to the Internet.

What is needed is a system that handles the error messaging and error processing in an efficient manner for applications executed on distributed systems. The present invention satisfies this and other needs.

SUMMARY OF THE INVENTION

The present invention is a method and system for tracking and processing errors in a distributed computer system in which a centralized error processing utility handles errors generated by one or more applications. Specifically, as an application encounters an error, the present invention intercepts and assumes the processing of that error event. This global error processing is facilitated by the distributed network connecting the applications running on various user computers. Upon receipt of an error message from an application, the system creates an informative error package, propagates appropriate error alert to relevant subsystems, and attempts to resolve the error. The error may be resolved in various ways. For example, the system may select and dispatch appropriate help information to the user; or the system may locate an alternative resource to substitute for the failed resource. The system may prioritize errors when there is more than one error still unresolved at any given time. In addition, the system may filter errors that require different levels of response and the system may direct errors to resources capable of assisting in resolving the error.

BRIEF DESCRIPTION OF THE DRAWINGS

FIG. 2 is a flow chart showing the method of the preferred embodiment.

DETAILED DESCRIPTION OF THE PREFERRED EMBODIMENT

Figure 1:
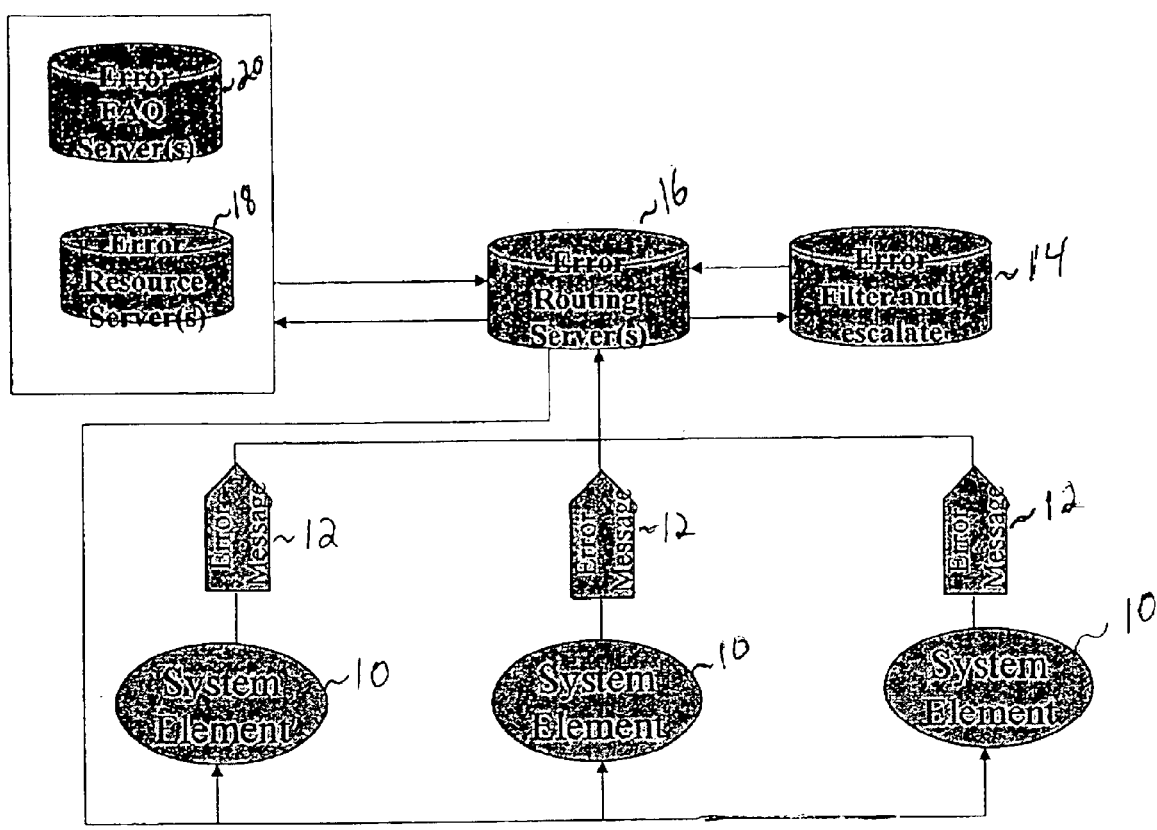
FIG. 1 is a block diagram showing the preferred embodiment of the present invention.

In the preferred embodiment of the present invention, the system creates error messages, propagates alerts and resolves errors that arise in the course of operation of a computer system. The system in accordance with the preferred embodiment may be an independent, self-contained program, operating on errors occurring in other computer programs. Alternatively the present system may be part of another computer program, typically, a large program having many sub-systems. The system is especially suitable for use with a network of computer systems where various applications or sub-systems may be operating simultaneously on different computers across the network, some operating independently and others operating cooperatively. However, the system and method of the present invention are generally applicable to computer systems, ranging from stand-alone computers to larger global computer networks. The term system element is used herein to refer to the broad range of computer programs and sub-systems that may be subject to the present invention, i.e., programs which generate errors. System elements include, for example, applications programs, sub-programs, operating systems, communication protocols, and drivers for peripherals. In addition, the term user refers to a party using an application but may also refer to the operator or monitor of a system element(s).

Typically, in modern programming, each system element is designed to handle exceptional conditions (such as expecting a message from another module, or trying to access a common resource which is unavailable), with an error message that is used in program debugging or is passed to an error handling routine that provides diagnostic information or user feedback. For example, within an application program, the error handling and debugging subsystems generate a specific error message associated with an unpredictable or unstable state within the application. The occurrences of errors are uniquely identified within the application program creating them, usually through a numbering or naming schema. In addition, programs typically log each error to a log file for diagnostic or audit purposes.

There are numerous different types of errors that may occur in a system element. For example, some errors may affect the internal logic of an application program such that the program is unable to undertake the task(s) that were requested and it exits this state in either a stable or unstable form. Other errors affect only the operation of that system element and are reported to the user. Still other errors affect the operation of other system elements, for example, when the application program that experienced the error is in communication with other system elements synchronously or asynchronously. In this case the error may cause a number of system elements to exit the functions being undertaken either in a stable or unstable form.

Creation

A central resource creates an error information package based on a signal received from a system element indicating the occurrence of an error, e.g., an error message generated by an application program. Referring to FIG. 1, the error routing server (16) is a computer or utility designed to be utilized by multiple applications and/or network computers. The error routing server acts as a clearinghouse directing incoming error messages and outgoing responses. As indicated by the arrows, error messages (12) generated by system elements (10) are sent to the error routing server (16). The error routing server (16) may then forward the error message (12) to the error resource server (18), which is a computer or utility designed to implement the central resource that processes errors as described herein. The error resource server (18) may use the error FAQ server (20) to obtain information responsive to the error being processed. Additionally, the error resource server (18) may have access to one or more databases offering a variety of assistance options responsive to errors. In addition, the error routing server (16) may forward incoming error messages (12) to an error filter (14) and escalate these errors. The error filter may separate errors of different types and instruct the error routing server where each error message should be sent for processing. Finally, these components provide assistance and/or resolve the error by sending, by way of the error routing server (16), an appropriate response or instruction to the system element (10) experiencing the error. The operation of these components is discussed in more detail in connection with FIG. 2.

Referring to FIG. 2, in the event of an error during the processing of a system element, the present invention intercepts the element's processing of the error or the system element generates an error message for onward transmission. At step 24, the system element determines whether the user is actively connected to the network. If the user is not actively connected to the network, at step 28, the error message may be sent to a local error management system if present and/or queued for later transmission. If at step 24, it is determined that the user is online, the process proceeds with step 26. At step 26, the element's error message is transmitted to a central resource for processing. The central resource may reside locally or on another area network computer or the Internet. The error may be formatted in a tamper resistant or secure format before transmission to the central resource. The central resource may be located remotely and connected via a distributed network such as the Internet. Generally, the error message is transmitted as the user is experiencing the error condition when using a complete network system with many points of failure.

At step 30, the central resource generates an error information package (error pack) based on the received error message. Each error pack may be identified by an error code, which may be a unique number for every occurrence of an error, or may also indicate the type of error as well. Sufficient additional information may be included in the error package to generate some provision of assistance to the user. For example, each error pack may include an identification of the application and/or subsystem element experiencing the error; a time stamp indicating the time that the error pack was created or the time that the error occurred; and an address indicating the location of the user (e.g. IP address, MAC address, or email address). A priority code may be included to indicate the priority of the error. The priority may range, for example, from terminal, such as a system failure of the specific program, to a service disconnect where the error is a completed function or operation. An indication of the internal state of the program or system element may also be included in the error pack in order to allow other system elements to adjust their response to this state. The internal state indicates the state of the application or subsystem experiencing the error, and enables the external system elements to adapt their responses to this situation.

In addition to generating an error information package, at step 32, the central resource dispatches to the originating application, or user, a help page or other dynamically updated help information. In this manner the user receives timely assistance as to the potential cause of the problem. The help message may direct the user to FAQ type pages associated with the problem at hand. In addition, the help message may generate an automatic help "bot" or wizard that assists the user through a number of scenarios to try to identify or clear the problem. A "bot" (as in robot) is a program used on the Internet that performs repetitive functions such as posting a message to multiple newsgroups or searching for information. These scenarios may be dynamic in that they respond to user input and/or additional error or system messages that are generated within the process.

Error messages received by the central resource may be grouped by their identifying number and processed either automatically or manually to update the knowledge base and associated assistance provided to the user. The error information package may be provided in a secure format and sent to the relevant system resource.

Propagation

Having generated an error information package, at step 34, the central resource propagates relevant information to any subsystem or program that may benefit from knowing about the occurrence of an error. The error information package may be sent to a corresponding web based error management resource. In addition, depending on the type of the error, error alert messages may be generated and propagated throughout the system. These messages are designed to create system alerts that indicate the system itself is experiencing a problem, such as a complete element failure or communications outage. Errors such as timeouts from delivery systems may in fact be used to dynamically switch those users from the resource that encountered the time out to another resource either locally or remotely.

The propagation of error alert messages to additional system elements may al so cause the system to respond in a different manner depending on the nature of the error(s). The errors from one system element may cause a different system element to respond differently by potentially resetting another element or providing an instruction to another to act upon. This depends on the circumstances and architecture of each particular system. The error alert propagation provides the basis for integration of error handling into a comprehensive customer care solution that includes the network and supporting infrastructure.

Resolution

The creation and propagation of the error information package and error alert messages may have a significant impact on the perceived and realized customer service. However, the ultimate goal is to resolve the error. The central resource therefore analyzes the error and provides a timely response to the user, even if that response only acts to inform the user of the problem they are experiencing.

Analyzing errors involves identification and evaluation of each error individually and/or in combination with other errors. Errors may be identified by the combination of information provided by the error information package. For example, based on the locations and internal state, the central resource may be able to assist in evaluation of the error and increase the likelihood of effective resolution.

During the course of operation of the underlying system elements, many errors may occur contemporaneously and for any given error there may be errors that occurred earlier in time that are not yet resolved. To handle the numerous errors that may remain outstanding at any given time, at step 36, the system may utilize an error routing server (16) to prioritize the processing of errors. The error routing server identifies those errors that present the most significant threat to the continued operation of an underlying system element. The routing server may take into account that various system elements have varying degrees of relative importance. For example, the operating system or some primary program that manages many other programs are more crucial than their respective application programs or modules. The decision as to which errors present the most important threats may be dependent on the priority level set beforehand and then evaluated through a series of rules. These rules may be initially defined, though over time these may be automatically updated and modified as a history of errors and failures develops. The routing server may also take into account that some errors may be related and should be handled jointly. Processing errors from various system elements at the central resource creates the ability to aggregate these errors and to provide alerts as to the problems with a primary system element, e.g., the failure of one or more delivery services or crucial pipes that are relied upon for other mission critical infrastructure.

One way in which the system evaluates an error is to confer with a database of error related information (step 38). The database may contain a history of past errors with suggestions as to resolutions of those errors. The database may contain a compilation of frequently occurring errors or frequently asked questions that may guide the system in resolving the instant error. The FAQ server may utilize common techniques to aggregate the errors and their causes, which may be indexed by both cause and error identification numbers. New FAQs may be created from the Error Resource Server, once the errors have been aggregated or associated with specific problems within the system elements.

The Error Resource Server is the repository of all the errors that are produced by the system. The Error Resource Server may hold the representation of the system architecture with each interface of the system elements, and can use these interfaces as the mechanism to categorize the errors received. The errors may be classified as either internal to a system element or external to an element. The definition of errors can include an identification of the system element and the relationship of the error to that system element, or other system elements. Errors can be related to each other in an object model using commonly known Object Modeling techniques, including, but not limited to, inheritance, pre and post conditions and attributes. Further details of such Object Modeling may be found in Meyer, "Object Oriented Software Construction" (Prentice Hall), the contents of which are incorporated herein by reference. The identification of the relationship between errors and the treatment of these as individual objects within a systematic model provides the core of the Error Resource Server. The mapping of the relationships of the errors to the system interface model provides the framework for the errors to be classified and accessed by the rest of the system.

The Error Resource Server provides the data resource for the rest of the error system, and acts as the repository from which the other system elements obtain their baseline information. This enables other system elements to provide an efficient and timely response to system errors, while at the same time maintaining a contemporaneous error management resource and management system that supports the operations of the systems. In this model, the errors that occur become part of the customer care method which enables the efficient operation of the system as a whole. In this way, errors become homogenous within the system operation as a whole. By using these resources the central resource may be able to identify the underlying problem causing an error or group of errors. Having identified a problem, the resource may proceed to address the problem if possible.

Since there are many different possible errors and problems, the central resource filters errors according to the types of response or remedy required. Such filtering is accomplished by an error filer (14). At step 40, the filter may separate out those errors that cannot be resolved without some physical change or human intervention. For example, an error caused by insufficient local disk space typically requires the user to delete some files creating available disk space or to add or replace disk space. Some errors may be filtered out and redirected for further processing. For example, an error that requires another system element to take action to resolve the issue may be redirected to the other system element. Another example is where a collection of system elements taken as a whole is dependent on external infrastructure or services provision that encountered a failure. In such an instance, the error may be redirected to the external element.

The error information packages generated by the central resource are well suited to importation into network management systems, which may be used for error management, monitoring, escalation and ultimately customer care.

In this way, the system and method of the invention handle errors by creating error information packages, propagating an error alert messages, and resolving the errors. It should be understood that the creation, propagation, and resolution functions may be performed either serially or in parallel, and may be performed by the same module or different modules. Additional functions such as dispatching assistance to handle the error, prioritizing the various errors, and applying the error filter, may similarly be performed in a different order or by one or more different modules, depending on the particular application.

While the invention has been particularly shown and described with reference to a preferred embodiment thereof, it will be understood by those skilled in the art that various changes in form and details may be made therein without departing from the spirit and scope of the invention.

What is claimed is:

1. A method for processing an error occurring in a system element operating in a computer system having a central-resource, the method comprising the steps of:
   receiving an error message at the central-resource from the system element indicating the occurrence of an error associated with the system element;
   determining whether a connection exists between the system element and the central-resource;
   transmitting the error message from the system element to the central resource when the connection exists; and
   when the connection does not exist, queuing the error message for later transmission to the central resource;
   referencing an error-resource having a plurality of assistance options;
   selecting an assistance option from the plurality of assistance options in accordance with the error message;
   filtering the error message for an error type:
   providing the assistance option to the system element through a routine server in accordance with the error type.

2. The method of claim 1, further comprising the step of selecting and dispatching appropriate help information to a user.

3. The method of claim 1, further comprising the step of directing the error events to resources capable of assisting in resolving the error.

4. The method of claim 1, further comprising the steps of:
   receiving a help query from one of the plurality of system elements;
   providing help information in response to the help query; and
   dynamically updating the help information.

5. The method of claim 1, wherein the providing step further comprises the step of dispatching help information to the system element associated with the error, where the dispatching step is performed substantially immediately after the receiving step.

6. The method of claim 5, further comprising the step of dynamically updating the help information.

7. The method of claim 5, further comprising the step of investigating the error by soliciting additional information about the occurrence of the error from the system element associated with the error.

8. The method of claim 1, further comprising the step of determining a preferred assistance option based on previous assistance options provided in response to an error; and wherein the selecting step includes selecting the preferred assistance option.

9. The method of claim 1, wherein the error-resource comprises a database containing information regarding resolution of errors and bypassing of errors.

10. The method of claim 1, further comprising the step of determining the priority of the error relative to any outstanding errors.

11. The method of claim 1, further comprising the step of generating an information-package in response to the receiving step; wherein the information-package comprises an error-identification, and at least one of a system identification, an application identification, a time stamp, a location, a priority, and an internal state.

12. The method of claim 1, further comprising the step of propagating an error alert to one or more components of the computer system that may be affected by the occurrence of the error.

13. The method of claim 1, further comprising the step of locating an alternative resource to substitute for a failed resource associated with the error.

14. The method of claim 1, wherein the assistance includes help information, the method further comprising the step of dynamically updating the help information.

15. The method of claim 1, further comprising the step of investigating the error by soliciting additional information about the occurrence of the error from the system element associated with the error.

16. A system for tracking and processing errors that occur in a distributed computer system, wherein the system comprises:
   a resource server for processing the errors;
   a database of information accessible to the resource server and useful in resolving and bypassing said errors;
   a routing server for contemporaneously directing messages and responses to the errors to and from components of the distributed computer system; and
   a filter for sorting said errors of different error types and directing the messages and the response to the errors through the routing server to different components of the distributed computer system in accordance with the error type.

17. A method for tracking and resolving errors, comprising the steps of:
   identifying the processing of at least two errors by at least one system element;
   intercepting the processing of the errors;
   generating at least two error messages related to each of the errors;
   filtering, by an error type, the error messages by determining at least one response category for each of the errors;
   generating a response for each of the error messages based at least in part on the response category; and
   dispatching, through a routing server, at least one response to a system element processing the error related to the response, in accordance with the error type.

18. The method of claim 17, wherein the filtering step further comprises determining the errors that require assistance of another system element.

19. The method of claim 17, wherein the filtering step further comprises determining the errors that require assistance of an external element.

20. The method of claim 17, wherein the filtering step further comprises determining the errors that require a physical change to a distributed computer system.

21. The method of claim 17, wherein the filtering step further comprises determining the errors that require user intervention.

22. The method of claim 17, wherein the filtering step further comprises determining the errors that are resolved automatically.

23. A method for tracking and resolving errors, comprising the steps of:
   receiving, at a central resource, at least two error messages, related to at least two errors occurring on at least one of a plurality of system elements;
   filtering, by an error type, the error messages by determining at least one category of response for each of the errors;
   generating, by the central resource, an error pack based on the error message, containing at least one assistance option; and
   transmitting the error pack to the system element that generated the error message, through a routing server in accordance with the error type.

24. The method for tracking and resolving errors, according to claim 23, further comprising the steps of:
   determining at least one priority level for each of the errors;
   prioritizing the error messages based on the priority level; and
   dispatching at least one response to the system element processing the error in an order based on the priority level.

25. The method of claim 24, wherein the prioritizing step further comprises identifying the error that is the most significant threat to the system element.

* * * * *